(12) United States Patent
Bruns et al.

(10) Patent No.: US 11,424,506 B2
(45) Date of Patent: Aug. 23, 2022

(54) RECHARGEABLE BATTERY TRANSPORTATION DEVICE FOR A RECHARGEABLE BATTERY

(71) Applicant: Stöbich technology GmbH, Goslar (DE)

(72) Inventors: Sascha Bruns, Wernigerode (DE); Stefan Tappe, Liebenburg (DE); Marc Dinse, Liebenburg (DE); Frank Krüger, Bad Harzburg (DE)

(73) Assignee: STOEBICH TECHNOLOGY GMBH, Goslar (DE)

(*) Notice: Subject to any disclaimer, the term of this patent is extended or adjusted under 35 U.S.C. 154(b) by 583 days.

(21) Appl. No.: 16/292,951

(22) Filed: Mar. 5, 2019

(65) Prior Publication Data

US 2019/0280259 A1    Sep. 12, 2019

(30) Foreign Application Priority Data

Mar. 9, 2018 (DE) .................... 10 2018 105 530.7

(51) Int. Cl.
*H01M 50/526* (2021.01)
*H01M 50/256* (2021.01)
*H01M 10/658* (2014.01)
*B65D 81/38* (2006.01)
*F17C 13/00* (2006.01)
*H01M 10/0525* (2010.01)
(Continued)

(52) U.S. Cl.
CPC ...... *H01M 50/256* (2021.01); *B65D 81/3813* (2013.01); *F17C 13/004* (2013.01); *H01M 10/0525* (2013.01); *H01M 10/658* (2015.04); *H01M 50/24* (2021.01); *H01M 50/30* (2021.01); *B65D 2585/88* (2013.01)

(58) Field of Classification Search
CPC .. H01M 50/256; H01M 10/658; H01M 50/24; H01M 50/30; H01M 10/0525; B65D 81/3813; F17C 13/004
See application file for complete search history.

(56) References Cited

U.S. PATENT DOCUMENTS 5,038,768 A * 8/1991 McGoff ................. A62B 19/00
                                                           128/202.26
2013/0146603 A1    6/2013 Brilmyer

FOREIGN PATENT DOCUMENTS

DE    202014004436 U1    7/2014
DE    102013222269 A1 *  4/2015 .......... H01M 50/394
DE    102013018406 A1    5/2015
(Continued)

*Primary Examiner* — Helen Oi K Conley
(74) *Attorney, Agent, or Firm* — WCF IP

(57) ABSTRACT

The invention relates to a rechargeable battery transportation device (10) for a re-chargeable battery (22), in particular a lithium rechargeable battery, with (a) an external case (12) which has (i) a base body (16) with a filling opening (20), (ii) a cap (18) for creating an air-tight seal of the filling opening (20), and (iii) a ventilation opening (28), and (b) an inner tank (14) which (i) is arranged in the external case (12) and (ii) encloses an accommodation space (30) for accommodating the rechargeable battery (22). According to the invention, between the external case (12) and the inner tank (14) there is at least one flow path (S) from the accommodation space (30) to the ventilation opening (28), and a heat absorption material (36) is arranged along the flow path (S).

20 Claims, 2 Drawing Sheets

Figure 1:
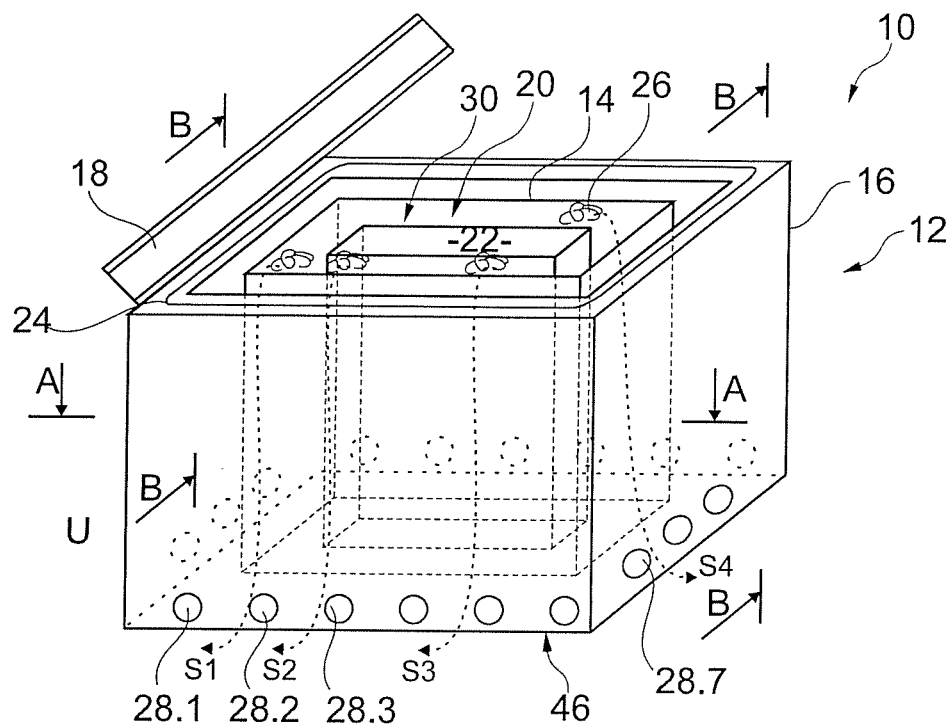

(51) Int. Cl.
 *H01M 50/24* (2021.01)
 *H01M 50/30* (2021.01)

(56) References Cited

FOREIGN PATENT DOCUMENTS

EP          0104511 A2    4/1984
WO     2016/033223 A1    3/2016

* cited by examiner

RECHARGEABLE BATTERY TRANSPORTATION DEVICE FOR A RECHARGEABLE BATTERY

The invention relates to a rechargeable battery transportation device for a rechargeable battery, in particular a lithium rechargeable battery, with (a) an external case which has (i) a base body with a filling opening, (ii) a cap for creating an air-tight seal of the filling opening, and (iii) a ventilation opening, and (b) an inner tank which (i) is arranged in the external case and (ii) encloses an accommodation space for accommodating the rechargeable battery.

This type of rechargeable battery transportation device is described in DE 20 2014 004 436 U1. Such rechargeable battery transportation devices serve to ensure the safe transportation of lithium rechargeable batteries in particular. Such lithium rechargeable batteries contain flammable substances and there is a risk of individual cells of the lithium rechargeable battery malfunctioning in a cascading sequence, thereby resulting in a chain reaction which destroys the lithium rechargeable battery. Damage of this nature results in the release of large amounts of gas. These gases may be poisonous and/or flammable. However, it must be ensured that a runaway of the rechargeable battery does not cause the environment around the rechargeable battery transport device to be exposed to impermissible danger.

Given that rechargeable battery transportation devices are needed in large quantities, it is also practical for them to be as structurally simple as possible. It is also beneficial if the effective volume ratio, i.e. the ratio of effective space in comparison to the space taken up by the rechargeable battery transportation device, is as large as possible.

WO 2016/033223 A1 describes a transportation device according to the preamble whose rechargeable batteries are arranged in the inner tank. The interior walls are lined with a superabsorbent polymer that is saturated with water. If a runaway of the lithium batteries does occur, this lining absorbs the heat. The resulting gases escape through a gap between the base body and the cap. The disadvantage of such a system is that, in the event of damages, escaping gases may be harmful to the surrounding environment.

A further rechargeable transportation device according to the preamble is known from US 2013/0146603 A1. The outer walls of the base body of this rechargeable battery transportation device are lined with heat-insulating material. The cap is sealed against the base body and features a gas purification device, such that poisonous vapors resulting from damages can be discharged having been purified by this gas purification device. This system is comparatively complex.

DE 10 2013 018 406 A1 describes a battery with a housing that surrounds several galvanic cells. A path runs between the galvanic cells and the housing, along which gases resulting from damages can flow. These gases escape via an exit opening. Prior to escaping through the exit opening, the gases must pass assembly parts provided for flow deflection and/or heat dissipation. As a result, particles are retained to a certain extent and the escaping gas is cooled.

The invention aims to suggest a rechargeable battery transportation device with a comparatively simple structure which still protects the environment as effectively as possible in the event of damage.

The invention solves the task by way of a rechargeable battery transportation device according to the preamble with a flow path that runs between the external case and the inner tank from the accommodation space to the ventilation opening, and that features a heat absorption material that is arranged along the flow path.

The advantage of this type of rechargeable battery transportation device is that any hot gases resulting from rechargeable battery damage must first of all flow along the heat absorption material in order to reach the ventilation opening. Whilst flowing along the heat absorption material, the gases are cooled. This reduces the likelihood of an ignition of the escaping gases or objects in the vicinity of the rechargeable battery transportation device.

It is also advantageous that the rechargeable battery transportation device can have a comparatively simple structure.

A further advantage is that the external walls of the external case can function as radiation surfaces for heat—which is emitted by hot gases escaping from the rechargeable battery—flowing along the flow path on the heat absorption material and which is then conducted to the external walls.

It is preferable if at least one of the flow paths runs along at least three external walls, especially along four external walls of the external case. This results in a larger heat dissipation surface and cools the escaping gases.

It is beneficial if panel-shaped heat absorption material is arranged on the external walls along which the flow path runs. It is especially beneficial if at least 80%, preferably at least 90%, of the inner surface of the external sides, along which the flow path flows, is lined with panel-shaped heat absorption material.

The heat absorption material should be understood to mean a material that reacts above an activation temperature under heat absorption, and in particular gives off steam. The activation temperature is preferably lower than 200°, especially lower than 150°. Particularly worthy of consideration is plaster which has two activation temperatures, namely 147° C. and 131° C.

The activation temperature should be understood particularly to mean the lowest temperature for which the following applies: after an hour at this temperature, over 90% by mass of the heat absorption material has reacted under heat absorption.

It is favourable if the heat absorption material reacts above the activation temperature, for example by emitting crystal water and/or separating water. Water possesses a high evaporation heat, meaning that a lot of heat is absorbed upon evaporation. In other words, the heat absorption material may contain mineral-bound water, especially crystal water, and/or adsorbed water, as is the case with a superabsorbent polymer for example.

It has been proven that a heat absorption material, of which at least 80% by weight is made of plaster, is especially well-suited to this purpose. Plaster has two activation temperatures, namely 147° C. and 131° C. Plaster is easily processed, mechanically resilient and dimensionally stable.

For instance, the panel-shaped heat absorption material refers to plasterboard panels. A plasterboard panel consists of a pressed core, which contains at least 80% by weight of plaster, and at least one layer of material that contains cellulose, which is attached to the core. When flowing along the panel-shaped heat absorption material, the gases give off heat to the heat absorption material, thereby cooling them.

The property that the heat absorption material is arranged along the flow path should be understood especially to mean that any gases resulting from damage flow so closely along the heat absorption material that they give off heat to the heat absorption material and, where applicable, can react chemically with the heat absorption material.

A granulate is preferably arranged along the flow path, said granulate containing calcium hydroxide. Calcium hydroxide reacts with acids in such a way that any acids that are present in the gases resulting from damages are bound.

A flow path should be understood to mean the trajectory along which an imaginary volume element of gas, which is the result of damages, can move. Of course, there is generally is large number of flow paths. Generally speaking, it is neither possible nor practical to identify every flow path and as such, this shall not be done here. If there are several flow paths present, the heat absorption material is preferably arranged such that at least 80% by weight, especially 90% by weight, of any gases resulting from damages flow along the heat absorption material.

The inner tank is preferably fluid-tight, especially liquid-tight and/or gas-tight. This means that any gas resulting from damages cannot escape through the walls or the inner tank; rather, it must escape upwards through the opening of the inner tank. It is possible, but not necessary, for the inner tank to have a cap. In this case, it is possible for the gas to escape through the cap or between the cap and the rest of the inner tank. With the exception of the at least one ventilation opening, the external case is preferably fluid-tight.

It is beneficial if the granulate contains an alkali metal hydroxide. For instance, this may be a sodium hydroxide and/or potassium hydroxide. It should be noted that when an object is described as being present, this should fundamentally understood to mean that at least one corresponding object is present. In the present case, this means that the granulate contains at least one alkali metal hydroxide. Alkali metal hydroxides are hygroscopic. As a result, their surfaces often feature a thin layer that contains water. This facilitates the reaction of the gas resulting from damages with the alkali metal hydroxide and, where applicable, the calcium hydroxide, such that harmful components in the gases are bound particularly quickly and effectively.

The granulate preferably contains an indicator. This indicator changes its color, for example, if the pH value changes by more than a predetermined difference. A change in the pH value indicates a decrease in the amount of calcium hydroxide and/or alkali metal hydroxide. This would indicate that there is a risk that any gases escaping in the event of damages are not likely to be able to be efficiently purified to a sufficient degree. Vice-versa, an unchanged indicator demonstrates that it can very likely be assumed that the harmful substance content of any gases resulting from damages will be reduced in accordance with the relevant specifications. The presence of the indicator has the advantage that it can be easily determined whether the rechargeable battery transportation device can continue to guarantee safe operation.

It is favorable if a median particle diameter of the granule particles lies between 1.5 and 5 millimeters. If the granulate particles are too small, it may cause too great a flow resistance for any gases resulting from damages. In this case, the internal pressure in the accommodation space, and therefore the force acting on the cap, may become too great, resulting in the failure of a sealing device, present according to a preferred embodiment, to seal the cap. In this case, potentially dangerous gases may escape uncooled and unpurified: this is to be prevented. On the other hand, if the particle diameter is too large, the surface that is available for a reaction of harmful components in the gases may be too small and as such, the purification effect may not be guaranteed. It has been proven that the median particle diameter given produces optimal results.

If the particles of the granulate are not shaped, the particle diameter should be understood to mean the aerodynamic diameter. In other words, the particle diameter in this case is the diameter of a hypothetical ball of the same mass which, at 1013 hPa and 22° C., falls as quickly in the air as the corresponding particle of the granulate. If the granulate particles are cylindrical, the diameter should be understood to mean the maximum taken from the length of the cylinder and its diameter.

It is especially practical if a maximum of 20% by weight of all granulate particles lie outside of an interval which ranges from one third of the median particle diameter up to three-times the median particle diameter.

The granulate particles are preferably cylindrical. This should be understood to mean that the particles of the granulate feature a cylinder barrel-shaped external structure. It is possible and preferable, but not necessary, that this refers strictly to cylindrical particles, i.e. that the top surfaces are level. This type of granulate in particular tends not to clump and forms a filling for which the flow resistances along flow paths do not deviate significantly from one another, said flow paths being different but of the same length. In other words, this type of filling is flowed through evenly, such that, on the one hand, a pressure which builds up in the accommodation space in the event of damage remains low and, on the other hand, escaping gases can be at least partially cleaned of at least some harmful substances to an efficient extent.

The granulate is preferably porous. For example, the pore volume is at least 30%, preferably at least 50%, of the volume of the granulate particle. This volume is determined by pycnometry. For instance, a cylinder with a diameter of 10 cm and a height of 30 cm is completely filled with granulate particles and then sealed. The container is then evacuated and a calculation is made to determine how much gas can flow into the cylinder after evacuation until a pressure equalization with the ambient pressure is reached. The ratio of this volume to the interior volume of the cylinder is a good approximation of the pore volume.

It is especially beneficial if the granulate is soda lime. Soda lime is a mix of calcium hydroxide and an alkali metal hydroxide, such as sodium hydroxide or potassium hydroxide, which is used in anaesthesia devices for example. It has been shown that soda lime is very efficient in the removal of harmful substances from gases which result from damages.

It is practical if an activated carbon filter is arranged in the flow path behind the granulate. Activated carbon can remove other harmful substances from the gases that result from damages. As it is arranged in the flow path behind the granulate, it is at comparatively low temperature. The lower the temperature of the gas, the more effective the adsorption of harmful substances to activated carbon.

According to a preferred embodiment, at least one flow path runs across a height difference of at least one third, especially at least the half, of the height of the external case. In other words, if the external case has a height H, at least one of the flow paths runs such that its path along at least one of the external walls covers a path length of at least H/3, especially at least H/2, especially preferably at least 2H/3. As a result, occurring gases are efficiently cooled and detoxified.

It is especially practical if the flow path runs downwards across at least one section whose length is greater than one third, especially at least the half, of the height of the external case. As a result, the cooling surface provided by the external wall is used efficiently.

The invention also includes a container formed of a rechargeable battery transportation device and at least one rechargeable battery, especially a lithium rechargeable battery, which is accommodated in the accommodation space of the inner tank.

In the following, the invention will be explained in more detail by way of the attached drawings. They show FIG. 1 a schematic view of a rechargeable battery transportation device according to the invention, FIG. 2 a cross section along the A-A plane according to FIG. 1, and FIG. 3 a cross section along the B-B section according to FIG. 1.

FIG. 1 shows a rechargeable battery transportation device 10 according to the invention with an external case 12 and an inner tank 14. The external case 12 comprises a base body 16 and a cap 18. The cap 18 is articulated on the base body 16 such that it can be swivelled, for instance. However, it is possible that the cap 18 can be completely removed. A schematically depicted rechargeable battery 22 can be introduced into the external case 12 through a filling opening 20.

If the cap 18 is closed, it forms an air-tight seal with the base body 16. To this end, a seal 24, for example, is arranged on an upper side of the base body 16 and/or the cap 18. If the rechargeable battery 22 is damaged, gases 26 emerge. These cannot escape between the cap and the base body 16.

The base body 16 features ventilation openings 28.1, 28.2, ... for this purpose. The gas 26 can flow along a flow path S from an accommodation space 30, through the ventilation openings 28.1, 28.2, ... into an environment U. The accommodation space 30 is the space that is enclosed by the inner tank 14 and in which the rechargeable battery 22 is accommodated.

Figure 2:
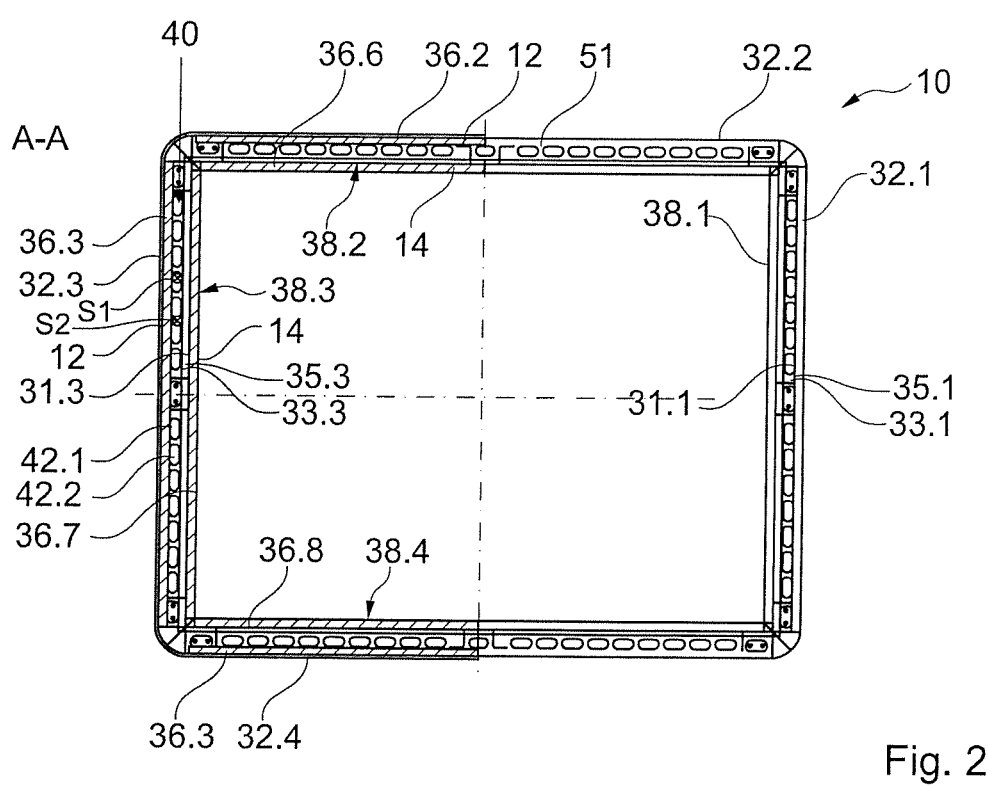

FIG. 2 depicts a horizontal cross-section through the rechargeable battery transportation device 10. It is clear to see that there is a gap 35 between an external side 31 of the inner tank 14 and an inner side 33 of the external case 12, wherein the flow paths S run through said gap. FIG. 2 shows that the flow paths S1, S2, ... run along four external walls 32.1, 32.2, 32.3, 32.4.

Panels 36.1, 36.2, ... are arranged along the inner sides of the external walls 32.$i$ ($i$=1, 2, 3, 4). In the present case, the panels 36 refer to plasterboards to which a paper or cardboard layer is glued on the outward-facing side and the inward-facing side. However, the panels may be uncoated on the inward-facing side, such that the gases flowing past the panel 36 come into direct contact with the plaster.

FIG. 2 also shows that the inner tank 14 features inner tank external walls 38.1, 38.2, 38.3, 38.4. Panels 36.5, 36.6, 36.7, 36.8 made of heat absorption material are also arranged along the inner tank external walls 38.$g$. The flow paths Sj (S=1, 2, ...) are therefore bordered on two sides by panel-shaped heat absorption material. This feature characterizes—independently of other features of the invention—a preferred embodiment of the invention.

A granulate 40, which is made up of a number of granulate particles 42.1, 42.2, ..., is arranged between the inner tank external walls 38.$i$ and the external walls 32.$i$. The granulate particles in FIG. 2 are all depicted as being the same size; however, this is not necessary. In particular, it is possible for the granulate particles to have varying particle diameters. The granulate particles 42.1, 42.2, ... are cylindrical and in the present case have a diameter of between 2 and 5 millimeters.

In the present case, the granulate is soda lime and consists of calcium hydroxide, sodium hydroxide, an indicator and, where appropriate, excipients. The indicator may be ethyl violet, for example.

Figure 3:
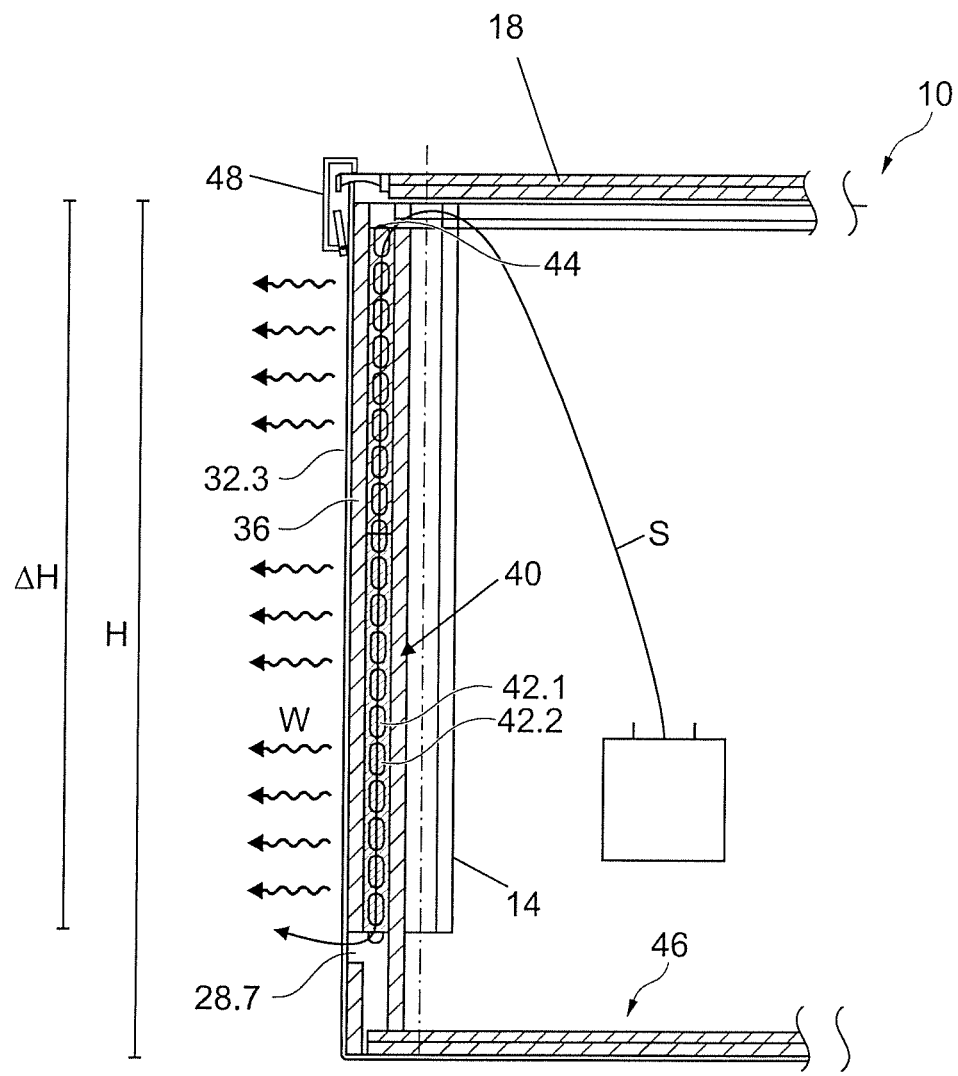

FIG. 3 depicts a further cross-section through the rechargeable battery transportation device 10 according to the invention. It is clear to see that the flow paths S5 pass an upper edge 44 of the inner tank 14 and then run downwards from the cap 18. The ventilation openings 28.$i$ are adjacent to a base 46 of the rechargeable battery transportation device 10. It is favorable and represents a preferred embodiment if the ventilation openings 28.$i$ are designed to be round, especially circular or oval.

In the present embodiment, the panels 36.$i$ have a thickness of between 8 mm and 20 mm. It has been proven that thicknesses of between 11 and 14 mm are particularly practical.

FIG. 3 also depicts a lock 48, by means of which the cap 18 is kept in its closed position. For instance, the lock 48 is a snap lock which features a bracket. The bracket is fixed to a lever which snaps into its closed position. In this closed position, the bracket engages with a hook, which may be designed as a groove and designed to be situated on the cap 18.

As depicted in FIG. 3, the flow path S runs along the external walls 32.2 across a height difference $\Delta H$ of at least one third, especially at least the half, of a height H of the external case 12. This section of the flow path S begins at the upper edge 44 and ends at the ventilation opening 28.7. This allows schematically depicted heat W to be effectively given off to the environment. It also results in a long path along the heat absorption material 36 and/or through the granulate 40. The flow path S runs down-wards over a section whose length corresponds to 0.8 times the height H.

REFERENCE LIST 10 rechargeable battery transportation device
12 external case
14 inner wall
16 base body
18 cap
20 inlet opening
22 rechargeable battery
24 seal
26 gas
28 ventilation opening
30 accommodation space
31 outer side of the inner tank
32 external wall
33 inner side of the external case
34 external wall
35 gap
36 panel
38 inner tank external wall
40 granulate
42 granulate particle
44 upper edge
46 base
48 lock
S flow path
U environment
W heat

The invention claimed is:
1. A rechargeable battery transportation device for a rechargeable battery, comprising:

(a) an external case comprising a base, an external wall having a ventilation opening adjacent the base, and at a case height above the base, a filling opening into the external case, and including a cap, movable between air-tight sealing of and not covering the filling opening;

(b) an inner tank, arranged in the external case and enclosing an accommodation space for the rechargeable battery, and comprising an inner tank wall separated from the external wall by a gap, and having an upper edge that is at a height above the base that is greater, by a height difference, than a height above the base of the ventilation opening, and the inner tank being configured to provide a path from the accommodation space, over the upper edge, to the gap; and (c) a panel arranged in the gap, comprising a heat absorption material and having an outer surface that is against the external wall, the gap and the panel being mutually configured to establish a downflow path from the upper edge to the ventilation opening, the mutual configuration including the gap extending from the upper edge to the ventilation opening and the panel having an inner surface spaced from and facing the inner tank wall as a flow surface of the downward flow path.

2. The rechargeable battery transportation device according to claim 1, further comprising a granulate arranged within the downward flow path, wherein the granulate includes:
calcium hydroxide, or
an alkali metal hydroxide, or
or both.

3. The rechargeable battery transportation device according to claim 2 wherein the granulate contains an indicator.

4. The rechargeable battery transportation device according to claim 2 wherein the granulate is in particulate form, having a median particle diameter ranging from 1.5 to 5 millimeters.

5. The rechargeable battery transportation device according to claim 2 wherein the granulate includes cylindrical particles.

6. The rechargeable battery transportation device according to claim 2 wherein the granulate is porous.

7. The rechargeable battery transportation device according to claim 2 wherein the granulate comprises soda lime.

8. The rechargeable battery transportation device according to claim 2 further comprising an activated carbon filter also arranged in the downward flow path.

9. The rechargeable battery transportation device according to claim 1 wherein the inner surface of the panel forms the surface of the downward flow path for a length that is at least one third of the case height of the external case.

10. The rechargeable battery transportation device according to claim 1, wherein the panel is configured such that the inner surface of the panel provides the flow surface for at least 80% of the length of the downward flow path.

11. The rechargeable battery transportation device according to claim 1 wherein the heat absorption material is a not-yet reacted material that, above a reaction temperature, undergoes a steam generating reaction.

12. The rechargeable battery transportation device according to claim 1, wherein the panel is an external wall panel, and the device further comprises:
an inner tank wall panel, also arranged in the gap, the inner tank wall panel including an inner tank wall panel inner surface that faces toward and is spaced from the external wall panel inner surface and an inner tank wall outer surface that is against the inner tank wall,
wherein and the inner surface of the inner tank wall panel surface faces the inner surface of the external wall panel and is another surface of the downward flow path.

13. The rechargeable battery transportation device according to claim 1, wherein the external tank, except for the ventilation opening, is both gas tight and fluid tight.

14. A rechargeable battery transportation device for a rechargeable battery, comprising:
(a) an external case comprising a base, an external wall having a ventilation opening adjacent the base and, at an upper side a case height above the base, a filling opening into the external case, and including a cap, movable between air-tight sealing of and not covering the filling opening;

(b) an inner tank, arranged in the external case and enclosing an accommodation space for the rechargeable battery, and comprising an inner tank wall separated from the external wall by a gap, and having an upper edge that is at a height above the base that is greater, by a height difference, than a height above the base of the ventilation opening, and the inner tank being configured to provide a path from the accommodation space, over the upper edge, to the gap; and (c) a panel arranged in the gap, comprising a heat absorption material and having an outer surface that is against the inner tank wall, the gap and the panel being mutually configured to establish a downflow path from the upper edge to the ventilation opening, the mutual configuration including the gap extending from the upper edge to the ventilation opening and the panel having an inner surface spaced from and facing the external tank wall as a flow surface of the downward flow path.

15. The rechargeable battery transportation device according to claim 14 wherein the heat absorption material is a not-yet reacted material that, above an activation temperature, undergoes a steam generating reaction.

16. The rechargeable battery transportation device according to claim 14, further comprising a granulate arranged within the downward flow path, wherein the granulate includes:
calcium hydroxide, or
an alkali metal hydroxide, or
both.

17. The rechargeable battery transportation device according to claim 16 wherein the granulate contains an indicator.

18. The rechargeable battery transportation device according to claim 16 wherein the granulate is in particulate form, having a median particle diameter ranging from 1.5 to 5 millimeters.

19. A rechargeable battery transportation device for a rechargeable battery, comprising:
an external case comprising a base, four external walls, each having a respective ventilation opening adjacent the base, the external case including an upper side that is a case height above the base and, at the upper side, a filling opening into the external case and a cap that is movable between air-tight sealing of and a not covering of the filling opening;
an inner tank, arranged in the external case and enclosing an accommodation space for the rechargeable battery, and comprising four inner tank walls, each having an upper edge and separated from a corresponding one of the external walls by a gap, establishing four gaps, and the inner tank is configured to provide, for each of the four gaps, a respective flow path from the accommodation space, over the upper edge of the inner tank wall associated with the gap, into the gap;

four panels, each arranged in a corresponding one of the four gaps, and comprising an unreacted heat absorption material that reacts above an activation temperature, with a steam generating reaction, each panel having an outer surface that is against the inner tank wall corresponding to the gap and an inner surface that is spaced from and faces toward the external tank wall corresponding to the gap, wherein, relative to the base, a height of the upper edge of each of the four inner tank walls is greater than a height of the ventilation opening of the corresponding external wall by a height difference, which is least one third of the case height, and for each of the four gaps and panel arranged therein, the gap and the panel are configured to provide a respective downward flow path within the gap, from the upper edge of the corresponding inner tank to the ventilation opening of the corresponding external wall, of a length that is the height difference, and for which the inner surface of the panel is a flow surface.

20. The rechargeable battery transportation device of claim 19, wherein the heat absorption material is a not-yet reacted material that, above an activation temperature, undergoes a steam generating reaction.

\* \* \* \* \*